(12) United States Patent
Stankiewicz et al.

(10) Patent No.: US 9,616,790 B2
(45) Date of Patent: Apr. 11, 2017

(54) FASTENER

(75) Inventors: Timothy J. Stankiewicz, Lathrup Village, MI (US); Sandra L. Smith, Waterford, MI (US); Gerald M. Moilanen, Commerce, MI (US)

(73) Assignee: Johnson Controls Technology Company, Holland, MI (US)

( * ) Notice: Subject to any disclaimer, the term of this patent is extended or adjusted under 35 U.S.C. 154(b) by 1163 days.

(21) Appl. No.: 13/133,869

(22) PCT Filed: Dec. 11, 2009

(86) PCT No.: PCT/US2009/067653
§ 371 (c)(1),
(2), (4) Date: Oct. 27, 2011

(87) PCT Pub. No.: WO2010/068854
PCT Pub. Date: Jun. 17, 2010

(65) Prior Publication Data
US 2012/0038200 A1    Feb. 16, 2012

Related U.S. Application Data

(60) Provisional application No. 61/122,159, filed on Dec. 12, 2008.

(51) Int. Cl.
*B60N 2/58*    (2006.01)
(52) U.S. Cl.
CPC ......... *B60N 2/5825* (2013.01); *Y10T 24/4523* (2015.01)

(58) Field of Classification Search
USPC ................................. 297/219.2, 219.3, 219.5
See application file for complete search history.

(56) References Cited

U.S. PATENT DOCUMENTS

| | | | | |
|---|---|---|---|---|
| 3,630,572 A | * | 12/1971 | Homier | 297/452.6 |
| 5,820,212 A | | 10/1998 | Hoshino et al. | |
| 5,826,939 A | * | 10/1998 | Beyer | 297/218.3 |
| 6,612,648 B1 | * | 9/2003 | Hashiguchi | 297/218.1 |
| 6,869,495 B2 | * | 3/2005 | Snooks | 156/244.11 |

(Continued)

FOREIGN PATENT DOCUMENTS

| | | |
|---|---|---|
| JP | 02-103400 | 8/1990 |
| JP | 2000-139626 | 5/2000 |

OTHER PUBLICATIONS

Patent Abstract of Japan Publication No. 02-103400, Date of Publication of Application: Aug. 16, 1990.

(Continued)

*Primary Examiner* — Sarah McPartlin
(74) *Attorney, Agent, or Firm* — Butzel Long

(57) ABSTRACT

A fastener, such as for coupling a trim cover to a seat, including an elongated body portion; a first end extending from the elongated body portion to define a connecting structure having a substantially J-shape, a middle portion between the elongated body portion and the first end, and a receiving space there between for receiving a structure; a second end extending distally from the elongated body portion for attachment to the trim cover; and wherein the connecting structure includes an arcuate hook shaped to define a barb pointing outward and a planar surface pointing inward for retaining the fastener on the structure.

6 Claims, 4 Drawing Sheets

(56) References Cited

U.S. PATENT DOCUMENTS 7,287,305 B2* 10/2007 Bednarski ........................ 24/297
7,568,761 B2* 8/2009 Mashimo ................... 297/218.4
8,240,759 B2* 8/2012 Hobl et al. ................. 297/218.1

OTHER PUBLICATIONS

Patent Abstract of Japan Publication No. 2000-139626, Date of Publication of Application: May 23, 2000.
Japanese Office Action Issued May 23, 2013.
A purported English language translation of Office Action, issued May 23, 2013.
English language translation of the First Office Action in a corresponding application in China (PCT Application entering into the national phase), Application No. 2009801543271.

* cited by examiner

FASTENER

CROSS-REFERENCE TO RELATED APPLICATIONS

This application claims the benefit of and priority to U.S. Provisional Patent Application No. 61/122,159, filed Dec. 12, 2008, titled: FASTENER, in the name of Stankiewicz et al. which is incorporated by reference herein.

BACKGROUND

The present disclosure, as currently understood, generally relates to the field of fasteners and fastening systems. More specifically, the present disclosure relates to a retainer or clip and the material as well as to a method of connecting a material to a seat structure within a vehicle seat using such a retainer.

Vehicle seats generally include a trim cover for finishing the seat to provide an acceptable aesthetic and to provide comfort to the occupant. Seat trim covers are commonly attached to the seat frame or other similar seat structure using fasteners and/or connectors. These connectors are commonly attached to the fabric or material of the seat cover or to an intermediate fabric or material attached to the seat cover.

Generally a needled non-woven polypropylene (PPO) fabric material is used to connect the trim cover to the seat structure using a "hog ring" type connector—a metal ring formed around the pieces being connected. The material may include an edge portion in the form of a thermoplastic bead. The bead may be preferably made integral and/or unitary with the material by forming or fusing the bead to the edge of the material in a heated extrusion process. The bead provides additional strength and rigidity to the edge of the material to help in preventing the hog ring connector from tearing out the edge of the material.

A clip, such as a J-shaped clip, may also be used to connect the material to the seat frame or other mounting structure in the seat. Clips are typically connected to the material using a sewn stitch or also using a melted PPO material to integrate the J-clip. The clip includes a first end for connecting it to the seat structure and a second end having the material stitched thereto. The second end is extended in length to provide sufficient overlap between the material so the sewn stitch will secure the clip and the material.

There remains, however, a continuing desire in the fasteners and fastening systems area for the development of a simple, low-cost design and method of manufacturing a fastening clip. More specifically, there remains a continuing desire for the development of a more simple, effective and ergonomic J-clip. There also remains a need for a more versatile fastener that reduces the number of differently sized and shaped fasteners needed for a particular purpose, such as fastening a trim cover to a seat.

SUMMARY

A fastener for coupling a trim cover to a seat, comprising an elongated body portion; a first end extending from the elongated body portion to define a connecting structure having a substantially J-shape, a middle portion between the elongated body portion and the first end, and a receiving space there between for receiving a structure; a second end extending distally from the elongated body portion for attachment to the trim cover; and wherein the connecting structure includes an arcuate hook shaped to define a barb pointing outward and a planar surface pointing inward for retaining the fastener on the structure.

A vehicle seat assembly for use in a vehicle, the vehicle seat assembly comprising a seat frame; a trim cover; a fastener comprising: an elongated body portion; a first end extending from the elongated body portion to define a connecting structure having a substantially J-shape, a middle portion between the elongated body portion and the first end, and a receiving space there between for receiving a structure located on the seat frame; a second end extending distally from the elongated body portion and attached to the trim cover; and wherein the connecting structure includes an arcuate hook shaped to define a barb pointing outward and a planar surface pointing inward for retaining the fastener on the seat frame and thereby securing the trim cover to the structure.

DETAILED DESCRIPTION

Figure 1:
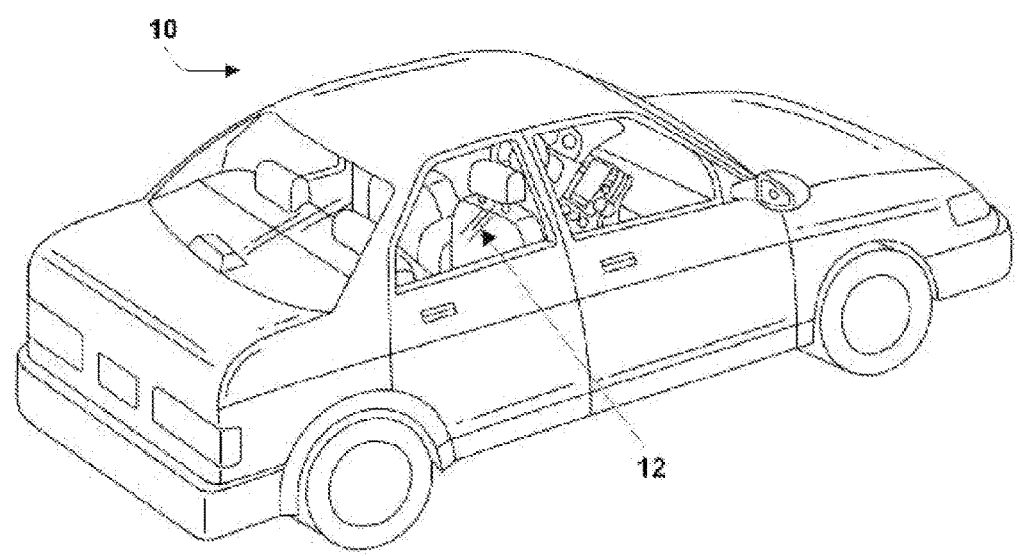
FIG. 1 shows a vehicle having a seat having a trim cover having a fastener according to an exemplary embodiment.

Referring to FIG. 1, a vehicle 10 having a vehicle seat assembly 12 according an exemplary embodiment is shown. While the vehicle 10 shown is a 4-door sedan, it should be understood that the seat may be used in a mini-van, sport utility vehicle or any other means in or by which someone travels or something is carried or conveyed for any market or application including everything from office seating and transportation to planes and space travel and everything in between.

Figure 2:
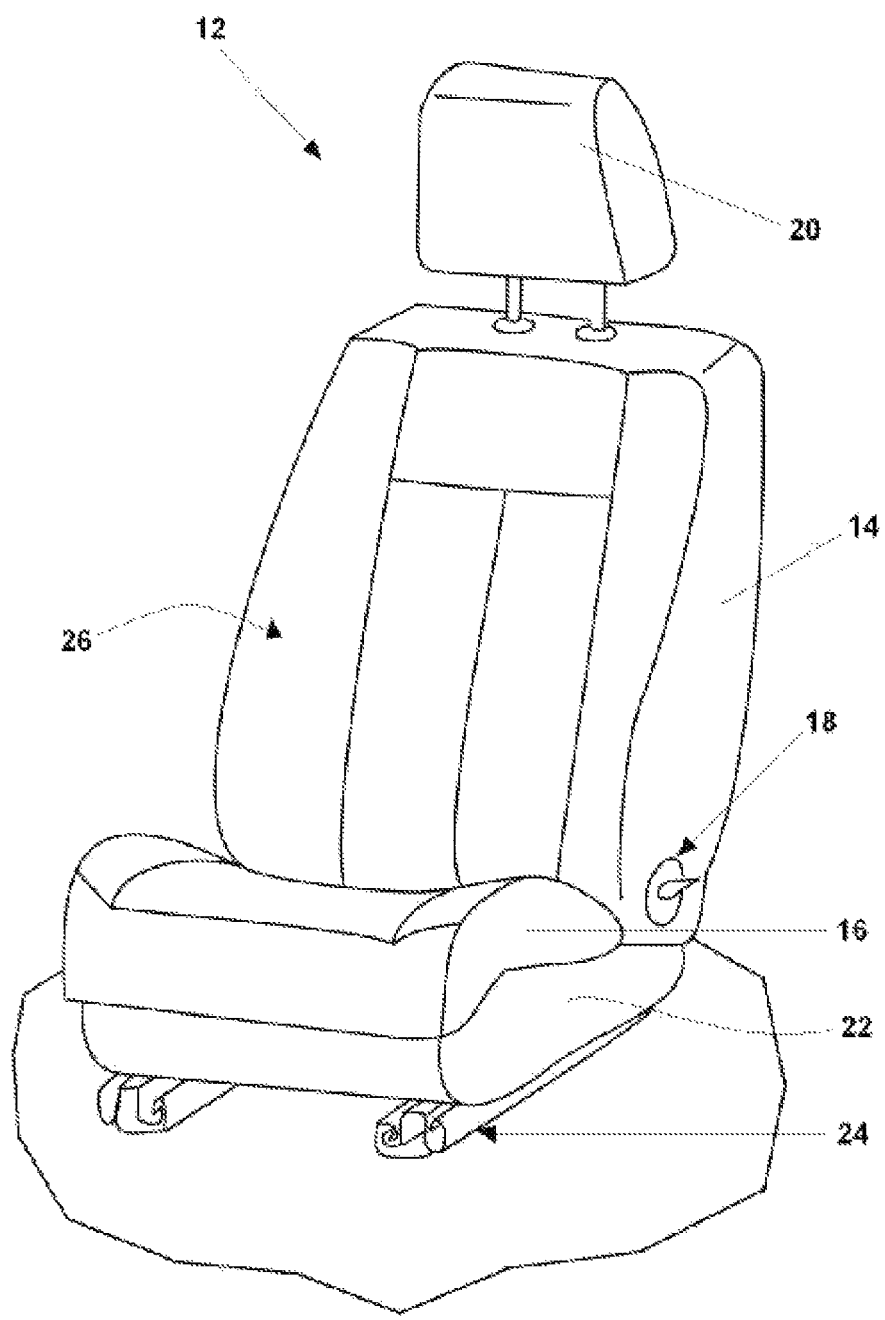
FIG. 2 shows a vehicle seat of the vehicle of FIG. 1 according to an exemplary embodiment.

Referring now to FIG. 2, there is shown a vehicle seat assembly 12 in an upright or design position according to an exemplary embodiment. The seat assembly 12 shown includes a seat back 14 pivotably coupled to a seat base 16 via a recliner mechanism 18 which enables the seat back 14 to be selectively pivoted in the fore and aft directions. The seat assembly 12 also includes a head restraint 20 and a seat base portion 22. The head restraint 20 extends upward from the seat back 14 and is configured to restrain the head of an occupant during an impact. The seat base portion 22 may be configured to allow the seat 12 to be selectively positioned (manually or motor driven) relative to the vehicle interior via a track assembly 24. The vehicle seat assembly 12 further includes a trim cover 26 for covering the seat frame, foam/cushions and other internal components of the vehicle seat 12 to enhance occupant comfort and aesthetic appearance.

Figure 3:
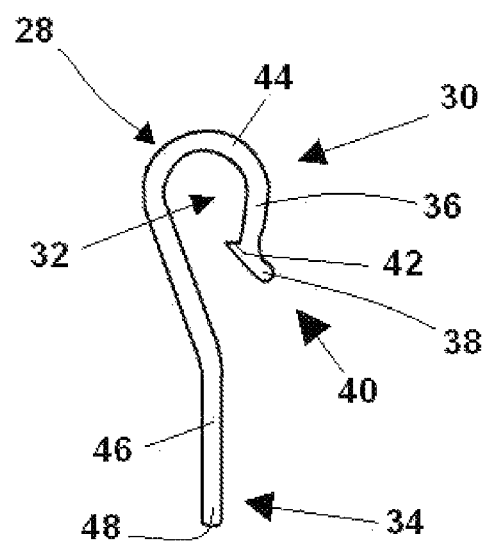
FIG. 3 shows a side view of a fastener according to an exemplary embodiment.

Referring particularly to FIG. 3, there is shown a side view of a fastener (clip) 28 according to an exemplary embodiment. The fastener 28 includes a first end 30 having a channel (receiving space) 32 and a material integrating portion or second end 34 located distal from the first end 30. The first end 30 includes a structure 36 for connecting the fastener 28 to a portion or structure of a vehicle seat (not shown). The first end 30 (e.g., thermoplastic means for attachment to the mounting structure) is preferably J-shaped in form but may have other shapes as desired or appropriate. The first end 30 also includes an arcuate hook 38 shaped to define a barb 40 pointing outward and having a planar surface 42 (a first horizontal planar surface and a second angled planar surface) pointing inward for retaining the fastener 28 on a structure (not shown). The barb 40 thereby obstructs access to the J-shaped end (first end) 30.

The fastener 28 further includes a "bight" or middle portion 44 located between and further defined by the first end 30 and the connecting structure 36. The middle portion 44 has a preferably arcuate shape but may be made to have a square, oval, rectangular, triangular, or any other known or appropriate shape according to an alternative embodiment. The middle portion 44 has defined therein a receiving space 32 for receiving the structure (e.g., wire attachment, etc.) to which the fastener 28 is intended to be attached. As with the connecting structure 36, the middle portion 44 is also preferably flexible to allow the first end 30 to move laterally with respect to the main body portion of the fastener 46 to allow snug or limited access to the receiving space 32. Similarly, the middle portion 44 is sufficiently stiff to prevent the fastener 28 from being undesirably removed from the structure (e.g., wire attachment) once the structure is positioned within the receiving space of the fastener 32. The barb 40 and more specifically, the planar surface of the barb 42 also aids in preventing detachment of the fastener 28 by obstructing the egress of the receiving space 32.

The second end 34 extends from the main body portion or member of the fastener 46, as best shown in FIG. 3. The main body portion includes a bend (bent portion or "kick out") having a predetermined bend angle, as best shown in FIG. 3. In an application where the fastener is sewn to a material (e.g., fabric, trim cover, etc.), the bend simplifies and facilitates (more controllable) the sewing process by enabling the fastener to be sewn face down without additional tension between the sewing machine surface and the sewing foot. The sewing process is facilitated because the angle is not too steep when the fastener is face down. It also eliminates the need for a mounted plate to guide the fastener, making the sewing surface flat. The fastener may also have varying thicknesses. For example, the thickness of the first end 30, middle portion 44, main body portion 46, and second end 34 vary relative to each other according to alternative embodiments. The fastener may also have a variety of cross-sectional profiles (e.g., cylindrical/tubular, rectangular, flat, etc.) and/or be tapered as needed and/or desirable. The second end 34 may be attached to a piece of fabric material (e.g., trim cover, etc.) according to a preferred embodiment (not shown). The fabric material is preferably PPO fibers or an approved equivalent. Although the above fabric material is particularly useful in the present disclosure, it should be understood that any needle punched, nonwoven PPO material will suffice provided it has characteristics equivalent to the characteristics of the fabric material identified above.

The fastener 28 is preferably made of polypropylene (PPO) material in an extrusion process as is well known in the art. The fastener 28 is also preferably made separately from the other elements to which it will be combined according to a preferred embodiment.

Figure 4:
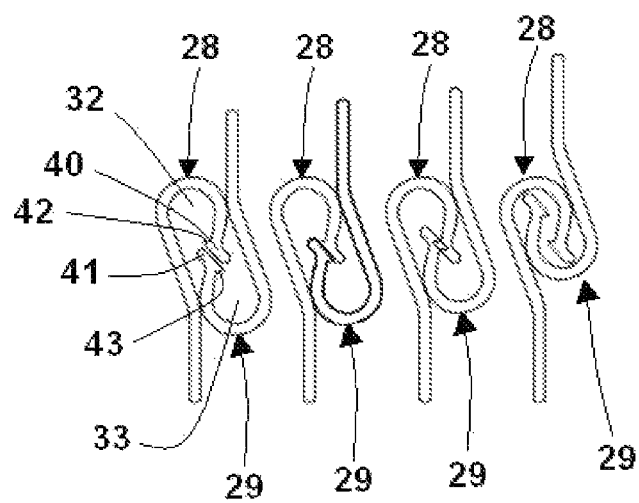
FIG. 4 shows a progression of side views of a fastener attaching to another fastener according to an exemplary embodiment of the present disclosure.

Referring particularly to FIG. 4, there is shown a first fastener 28 attached to a second fastener 29 according to an exemplary embodiment. The contours of the arcuate hook 38 provide for a smooth coupling action between a first fastener 28 and the second fastener 29. Once the barb of each fastener 40, 41 enters the receiving space of the other barb 32, 33, the fasteners 28, 29 are linked with the planar surface of the first and second barb 42, 43 acting as an interlocking mechanism that inhibits unlinking of the first fastener 28 with the second fastener 29.

Figure 5:
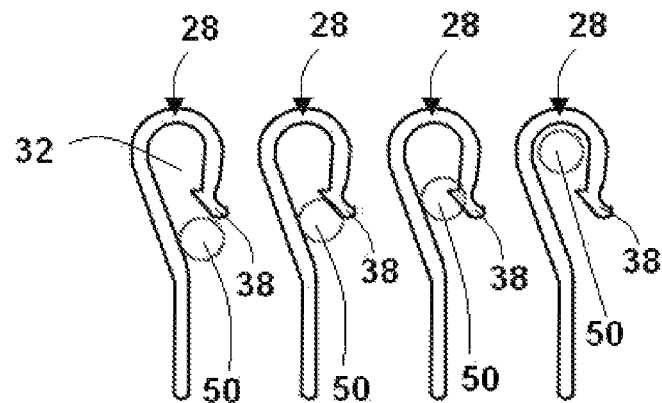
FIG. 5 shows a progression of side views of the fastener coupling to a 6 gage wire attachment according to an exemplary embodiment.
Figure 6:
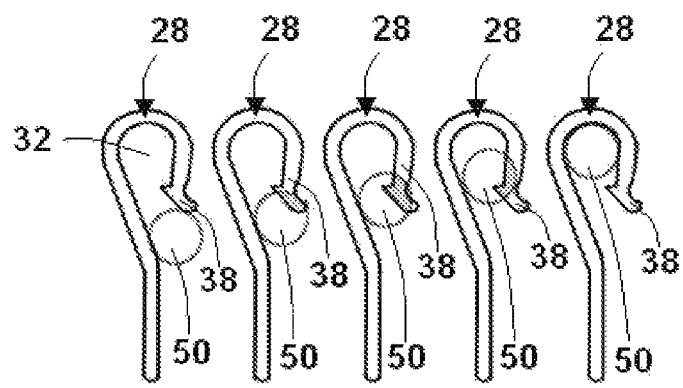
FIG. 6 shows a progression of side views of the fastener coupling to a 4 gage wire attachment according to an exemplary embodiment.

Referring particularly to FIG. 5 and FIG. 6, there is shown an extruded fastener 28 attached to a wire attachment (e.g., six gage, four gage, etc.) 50. While the wire attachment in FIG. 5 is six gage and the wire attachment in FIG. 6 is six gage, the fastener can be constructed to accommodate any desirable gage of material (e.g., wire or rod diameter, etc.). The contours of the arcuate hook 38 facilitates a smooth and snug coupling with structures, namely those structures with contours similar to those of the arcuate hook 38, such as wire attachments or other structures that are circular, spherical, cylindrical, or curved in nature. Once inserted into the receiving space of the clip 32, the structure is inhibited from exiting the receiving space by the arcuate hook 38 and more specifically, by the planar surface of the arcuate hook 42.

For purposes of this disclosure, the term "coupled" means the joining of two components (mechanical and/or electrical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the easy entry recliner mechanism as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the appended claims. Other substitutions, modifications, changes, and omissions may be made in the design, operating conditions, and arrangement of the preferred and other exemplary embodiments without departing from the spirit of the present innovations.

What is claimed is:

1. A fastener, for use in coupling a seat trim cover to a seat, the fastener comprising:
   an elongated body portion;
   a first end extending from the elongated body portion having a substantially J-shape, a middle portion positioned between the elongated body portion and the first end, and a receiving space located between the first end and elongated body portion for receiving a structure;
   a single second end extending distally from the elongated body portion for sewing the trim cover to the second end, wherein the first end includes an arcuate hook having a barb pointing outward and a planar surface pointing inward for retaining the fastener on the structure; and
   wherein the elongated body portion has a bent portion having a predetermined bend angle located between the first and second ends to enable the fastener to be sewn face down without additional tension between a sewing machine surface and a sewing foot.

2. The fastener of claim 1, wherein the middle portion has a resiliency that enables the first end to move laterally with respect to the elongated body portion to limit access to the receiving space and prevent detachment of the fastener from the structure.

3. The fastener of claim 2, wherein the planar surface prevents detachment of the fastener by obstructing egress from the receiving space and retaining the structure in the receiving space.

4. The fastener of claim 1, wherein the barb has an arcuate contour to couple the fastener to the structure.

5. The fastener of claim 1, wherein the elongated body portion has a bent portion located between the first and second ends.

6. The fastener of claim 1, wherein a first fastener can be linked with a second fastener having the same structure as the first fastener by engaging the first fastener barb within the second fastener receiving space and the planar surface of the first fastener barb interlocks with the planar surface of the second fastener barb.

\* \* \* \* \*